June 4, 1929.

A. W. BECK

TOY

Re. 17,312

2 Sheets-Sheet 1

Original Filed March 28, 1925

INVENTOR

August W. Beck, by Spring, Stubbs & Parmelee, his attys.

June 4, 1929.
A. W. BECK
TOY
Re. 17,312
2 Sheets-Sheet 2
Original Filed March 28, 1925
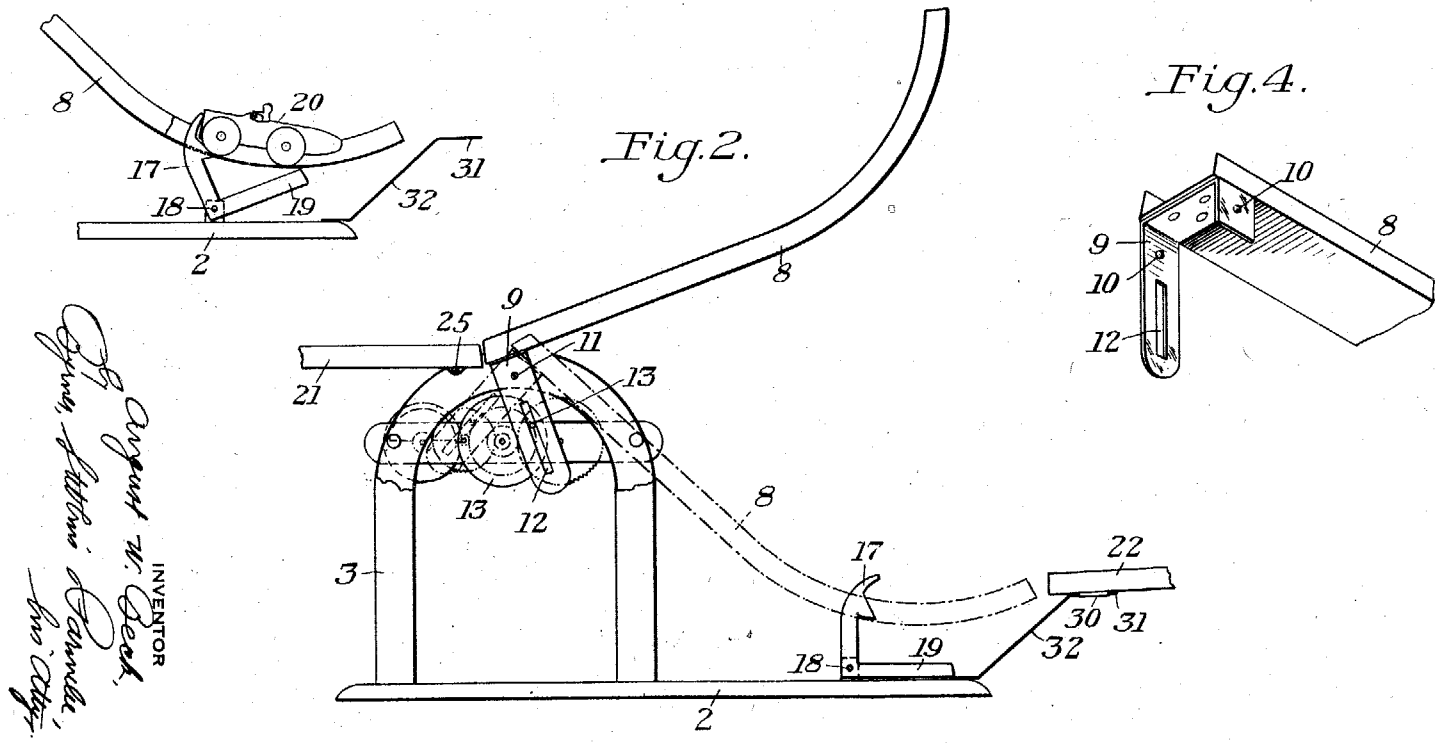
INVENTOR
August W. Beck,
by Byrnes, Townsend & Parmelee,
his Attys.

Reissued June 4, 1929. Re. 17,312

UNITED STATES PATENT OFFICE.

AUGUST W. BECK, OF PITTSBURGH, PENNSYLVANIA, ASSIGNOR, BY DIRECT AND MESNE ASSIGNMENTS, TO METAL TOY COMPANY, OF PITTSBURGH, PENNSYLVANIA, A CORPORATION OF PENNSYLVANIA.

TOY.

Original No. 1,551,002, dated August 25, 1925, Serial No. 18,995, filed March 28, 1925. Application for reissue filed August 24, 1927. Serial No. 215,217.

The present invention relates broadly to toys, and more particularly to toys of the roller coaster type, in which a movable body is adapted to travel continuously in one direction from a point of higher elevation to a point of lower elevation, there being elevating means intermediate the high and low points of the track.

I am aware that it has heretofore been proposed to provide roller coaster toys of the general character herein contemplated in which a movable body travels longitudinally in opposite directions over at least certain portions of track common to the travel in both directions. I have found, however, that very amusing results can be obtained by the construction of a toy having a track in the form of a loop over which the movable body always travels in the same direction, thereby providing a longer path for acceleration and insuring faster travel than is possible where the direction of travel of the object is alternately reversed.

Preferably, my improved toy embodies a looped track of gradual inclination from end to end, the ends being spaced to receive an elevating track section therebetween.

In the accompanying drawings, there is shown for purposes of illustration only, a preferred embodiment of the present invention, it being understood that the drawings do not define the limits of my invention, as changes in the construction and operation disclosed therein may be made without departing from the spirit of the invention or the scope of my broader claims.

In the drawings:

Figure 2 is a side elevation of a portion of the toy, illustrating more in detail the construction and mounting of the elevating track section;

Figure 3 is a detail view, partly broken away, illustrating the manner of releasing the elevating track section by the action of the movable body; and Figure 4 is a perspective view, illustrating the upper end of the elevating track section.

Figure 1:
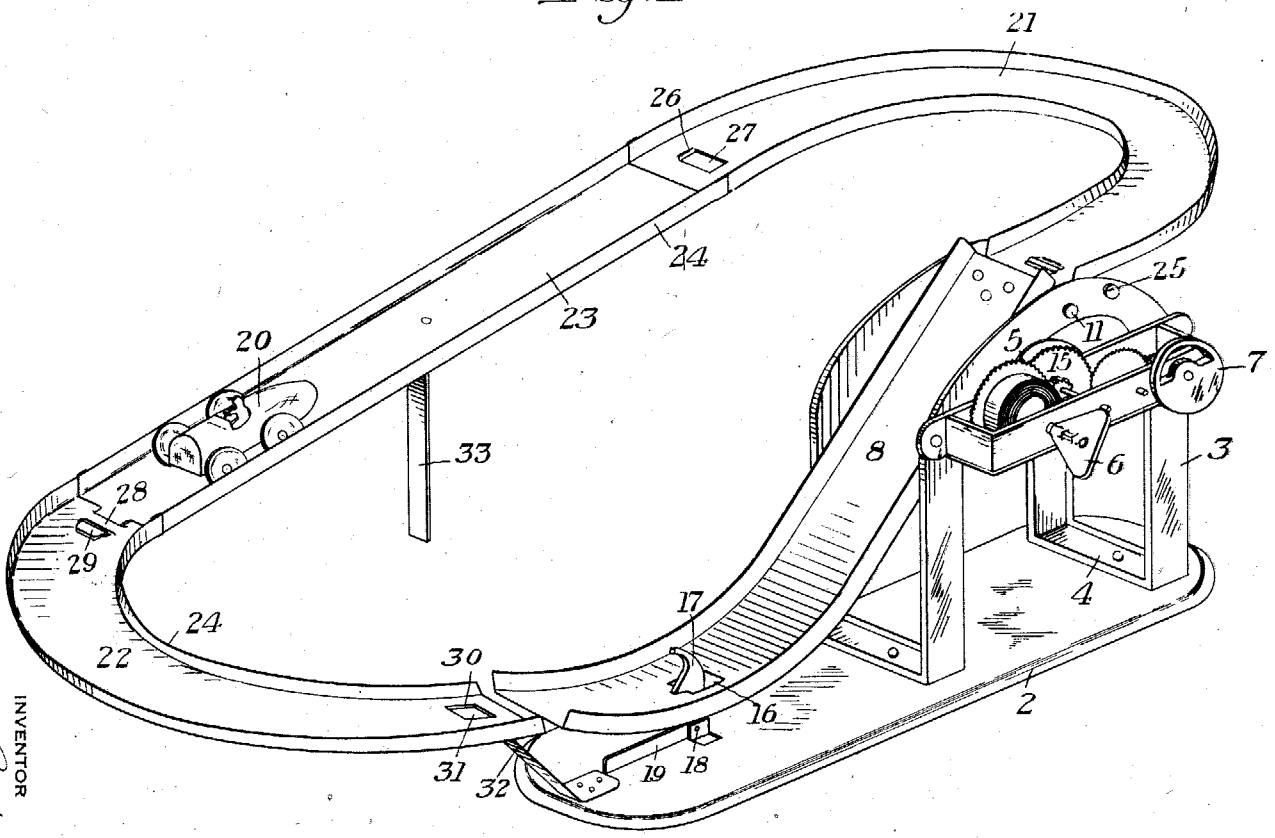
Figure 1 is a perspective view of the toy, showing the elevating track section in its lower position.

In carrying out the present invention, there may be provided a base 2, preferably of elongated configuration and having secured to the upper surface thereof adjacent one end a motor bracket 3. This bracket may conveniently comprise a single stamping adapted to form transversely extending feet 4 and inverted U-shaped side members. Carried by one of the side members is a driving motor 5 which may conveniently be of the spring type having a winding key 6 and a governor 7.

Pivotally mounted between the side members of the motor bracket is an elevating track section 8 having a substantially straight upper portion and a curved lower portion. Secured to the under side of the elevating track section, as clearly shown in Figure 4, is a bearing bracket 9 having downwardly projecting legs, each of which is provided with an opening 10. Extending transversely through the openings 10 is a pivot shaft 11 journaled in the motor bracket. One of the legs of the bearing bracket is extended downwardly beyond the other leg and is formed with an elongated opening 12. This elongated opening is adapted to receive a crank pin 13 carried by an operating gear 15 actuated by the motor 5. The construction is such that upon rotation of the motor the crank pin 13 will be effective for moving the elevating track section 8 from its chain line position of Figure 2 to the full line position, and for thereafter returning the section to its original position.

The lower curved end of the elevating track section has an opening 16 extending therethrough adapted to receive the upper end of a combined trigger and pawl 17 having a pivotal mounting 18 on the base 2 adjacent the end opposite that which carries the motor bracket. This pawl is preferably of substantially L-shape to provide a projecting leg 19 adapted to always insure return of the parts to the position shown in Figure 2. In this position the pawl will engage the track section and prevent operation of the motor. It will be apparent, however, that upon release of the pawl the track section will be operated as before described.

Cooperating with the elevating track section 8 is at least one other track section adapted to form a looped track for the continuous travel of a movable body such as a car 20. Conveniently, the remainder of the track may comprise an upper curved end section 21, a lower curved end section 22 and an intermediate substantially straight section 23. Each of the sections, including the elevating track section, is preferably formed with upstanding side flanges 24 to effectively guide the movable body in its travel around the loop. One end of the curved section 21 is shaped to receive a pin 25 carried by the motor bracket and serving to secure the section 21 in cooperative relation to the elevating track section. The opposite end of the section 21 may have a downwardly pressed portion 26 adapted to receive a tongue 27 projecting from the intermediate section 23, whereby the ends of the sections may be effectively interengaged.

The other end section 22 is of a construction substantially similar to that before described, it, however, having adjacent one end an upwardly pressed strap 28 adapted to receive therebelow the tongue 29 projecting from the intermediate section. In its opposite end the section 22 is formed with a downwardly pressed strap 30 adapted to receive the upper angularly bent end 31 of a support 32 projecting upwardly from the end of the base 2 opposite that which carries the motor bracket. This secures the lower end of the section 22 in cooperative relation to the curved end of the elevating track section.

Inasmuch as the base is of comparatively small size, facilitating packing and transportation thereof, the main portion of the track projects beyond the base. In order to support the projecting portion and thereby prevent the base from tipping, the intermediate section 23 may have a supporting leg 33 secured to the under side thereof and adapted to cooperate with the support upon which the base 2 rests.

It will be understood that the construction described provides a track over which the car 20 is adapted to travel continuously in one direction. The track is preferably of gradual downward inclination from the motor bracket to the end of the section 22 which cooperates with the base, whereby the elevating section 8 upon its operation delivers the car initially to the highest point of the track, thereby permitting it to accelerate continuously during its travel around the loop. During its travel, the car strikes the upper end of the combined trigger and pawl 17, thereby moving it to the position illustrated in detail in Figure 3. This releases the track section 8 and permits the motor to immediately bring it to the full line position shown in Figure 2 for delivering the car onto the high point of the track. The elevating track section thereupon returns to its lower position, where it is engaged by the combined trigger and pawl and held until it is again released by the movement of the car.

By providing a track over which the car travels continuously in one direction, it is permitted to freely accelerate its speed from the time of delivery from the elevating track section to the time of engagement with the combined trigger and pawl. This not only insures momentum to effect the release of the elevating track section, but also gives the effect of a racing car, which appeals to the operator.

The advantages of the present invention arise from the provision of a toy of the roller coaster type having a track in the form of a loop with means intermediate the ends of the loop cooperating respectively with the high and low points thereof.

Further advantages arise from the construction of the base and means for supporting and interconnecting the track sections whereby the track may be quickly set up and firmly supported.

I claim—

1. A toy, comprising a portable base having a motor bracket, an elevating track section pivotally carried by said bracket and along which a movable body is adapted to travel in the same direction, a motor carried by said bracket and adapted to elevate said section, and at least one supplemental track section having longitudinally and vertically offset end portions adapted to cooperate with the opposite ends of said elevating track section to form a track loop for the continuous travel in one direction of a movable body, said supplemental section being secured to said bracket at one end and to the base at the opposite end, substantially as described.

2. A toy, comprising a portable base having a motor bracket adjacent one end, an elevating track section pivotally carried by said bracket, a motor carried by said bracket and adapted to elevate said section, a plurality of interengaged track sections adapted to cooperate with the opposite ends of said elevating track section to form a continuous track loop for the continuous travel in one direction of a movable body, one of said supplemental sections being secured to the motor bracket at one end, and another of said supplemental sections being supported adjacent the opposite end of the base, substantially as described.

3. A toy, comprising a track loop comprising curved end sections and intermediate connecting sections, one of said connecting sections having a curved lower end and an inclined upper end, a pivotal mounting for said upper end, and means cooperating with said mounting for raising and lowering the pivotally mounted section, substantially as described.

4. A toy, comprising a track loop comprising curved end sections and intermediate connecting sections, one of said connecting sections having a curved lower end and an inclined upper end, a pivotal mounting for said upper end, and means cooperating with said mounting for raising and lowering the pivotally mounted section, said track loop being gradually inclined downwardly in the same direction throughout the major portion of its travel, substantially as described.

5. A toy, comprising a portable base having a motor bracket adjacent one end, pivoted elevating means cooperating with said bracket, a motor carried by said bracket and adapted to operate said elevating means, and at least one track section adapted to cooperate with the opposite ends of said elevating means to form a loop for the continuous travel in one direction of a movable body, said section being secured to said bracket at one end and to the base at the opposite end to provide vertically and longitudinally offset end portions for cooperation with opposite ends of said elevating means, substantially as described.

6. A toy, comprising a portable base having a motor bracket, elevating means cooperating with said bracket, a motor carried by said bracket and adapted to operate said elevating means, and at least one track section adapted to cooperate with the opposite ends of said elevating means to form a loop for the continuous travel in one direction of a movable body, said section being secured to said bracket at one end and to the base at the opposite end, said elevating means having one portion thereof cooperating at all times with said track section, substantially as described.

7. A toy, comprising a portable base having a bracket adjacent one end mounted thereon for operating mechanism, elevating means cooperating with said bracket, operating means carried by said bracket and adapted to operate said elevating means, said elevating means having at least one portion thereof movable about a fixed axis, and at least one track section adapted to cooperate with the opposite ends of said elevating means to form a loop for the continuous travel in one direction of a movable body, said section being secured to said bracket at one end and to the base at the opposite end to provide vertically and longitudinally offset end portions for cooperation with opposite ends of said elevating means.

8. A toy, comprising a portable base having portions thereof at different elevations, at least one track section cooperating with said base and having its opposite ends secured thereto at different elevations, elevating means intermediate the ends of said track section for raising a moving body from a point of lower elevation to a point of higher elevation to permit continuous travel in one direction of a moving body, and a fixed axis with which at least one end of said elevating means cooperates, as substantially described.

9. A toy, comprising a portable base having portions thereof at different elevations, at least one track section cooperating with said base and providing an unbroken supporting surface throughout its length, said section having its opposite ends secured to the base at different elevations, elevating means intermediate the ends of said track section for raising a moving body from a point of lower elevation to a point of higher elevation to permit continuous travel in one direction of a moving body, and a fixed axis adjacent one end of said track section with which at least one end of said elevating means cooperates.

10. A toy, comprising a portable base having portions thereof at different elevations, at least one track section cooperating with said base and providing an unbroken supporting surface throughout its length, said section having its opposite ends secured to the base at different elevations, elevating means intermediate the ends of said track section for raising a moving body from a point of lower elevation to a point of higher elevation and effecting longitudinal travel of the moving body to permit continuous travel in one direction of a moving body, and a fixed axis adjacent one end of said track section with which at least one end of said elevating means cooperates.

11. A toy, comprising a portable base having portions thereof at different elevations, at least one track section cooperating with said base and having its opposite ends secured thereto at different elevations and in longitudinally offset relationship, elevating means providing at all times a continuously inclined path along which a moving body is adapted to travel in a longitudinal direction between said ends and effective for raising a moving body from a point of lower elevation to a point of higher elevation to permit continuous travel in one direction of a moving body, and a fixed axis with which at least one end of said elevating means cooperates.

In testimony whereof I have hereunto set my hand.

AUGUST W. BECK.